Jan. 9, 1951 R. V. PHELPS 2,537,085
CARGO.-TYPE TANK VESSEL HAVING SEPARABLE TANKS
Filed Oct. 25, 1946

Inventor
REX V. PHELPS,
By Prevost + Prevost.
Attorneys

Patented Jan. 9, 1951

2,537,085

UNITED STATES PATENT OFFICE 2,537,085

CARGO-TYPE TANK VESSEL HAVING SEPARABLE TANKS

Rex V. Phelps, Tulsa, Okla., assignor to Warren Petroleum Corporation, Tulsa, Okla.

Application October 25, 1946, Serial No. 705,523

4 Claims. (Cl. 114—74)

This invention relates to an improved cargo unit for transporting fluids and more particularly to a cargo unit for transporting liquefied petroleum gas in cargo-type vessels for coastwise or foreign service.

The primary object of the invention is to provide cargo units which permit the installation of a larger amount of storage capacity in tanks in a cargo vessel, than in any other manner, principally because present Coast Guard regulations governing the installation of single cylindrical tanks require spacing of not less than 15 inches between adjacent tanks. My cargo unit allows a plurality of tanks or various combinations in each unit to be placed closer together, thereby increasing the number of tanks which may be installed on any particular cargo vessel.

Another object is to supply a cargo unit including a cluster of tanks communicating with one another at the top and bottom so that fewer tank openings and fittings are required, thereby simplifying the problems of filling and unloading.

A still further object is to provide a cargo unit comprising a number of tanks so assembled and arranged that the entire unit, or each separate tank, may be lifted or rotated for purposes of inspection.

With the foregoing objects outlined and with other objects in view which will appear as the description proceeds, the invention consists in the novel features hereinafter described in detail, illustrated in the accompanying drawings, and more particularly pointed out in the appended claims.

Figure 1:
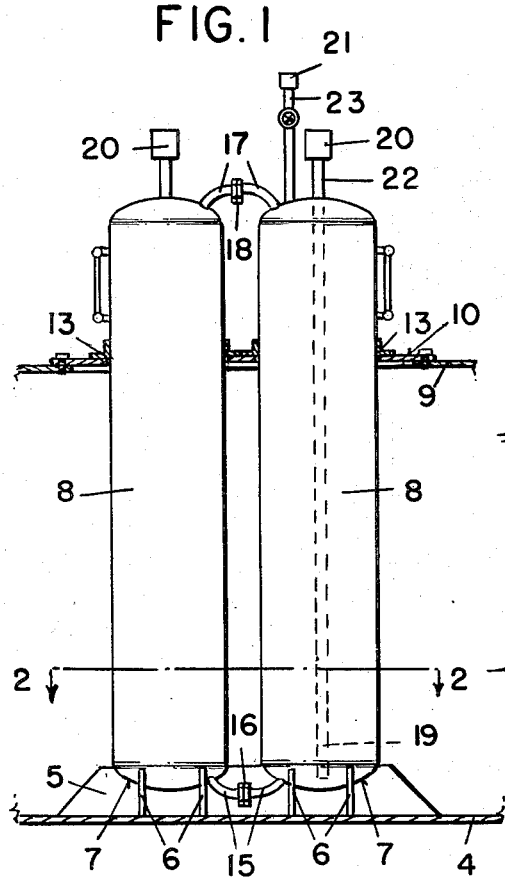
Fig. 1 is a side elevation of my cargo unit shown installed on a cargo-type ship with only the essential parts of the ship illustrated to disclose the manner in which the unit is mounted thereon.

Referring to the drawings, 4 designates the inner bottom or metal floor of a cargo-type vessel on which I mount longitudinal and transverse webs 5 and 6 which are vertically arranged in spaced relation to one another and are preferably welded to one another and to the inner bottom of the ship. As best shown in Fig. 1, the upper edges of the webs are concave, as indicated at 7 to provide a saddle or seats for a series or group of vertically disposed tanks 8, each preferably having a cylindrical body and a substantially hemispherical top and bottom.

Figure 3:
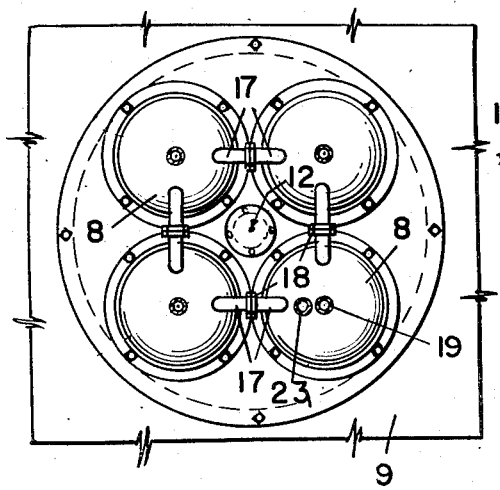
Fig. 3 is a top plan view.
Figure 4:
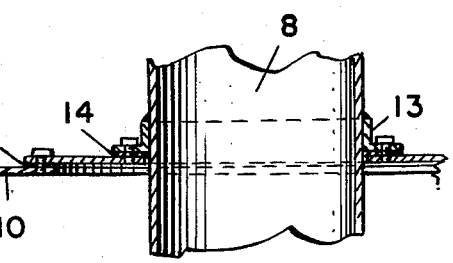
Fig. 4 is a fragmentary vertical sectional view of a detail.

The upper portion of the tanks extend through a hole in the deck 9 and holes in a top plate 10, the latter functioning as a cover for the hole in the deck and being detachably secured thereto in a liquid-tight manner, as indicated at 11. Obviously, if the connection at 11 is loosened or removed, the entire group of tanks can be lifted off the saddle or seats at the bottom of the ship and if the hole in the deck and the plate 10 are of circular form, the entire unit can be lifted and rotated about the axis 12 (Fig. 3).

Each tank may extend loosely through a hole in the cover plate 10 and be provided with a horizontal ring or flange 13 that may be detachably secured to the cover by sealed joints, indicated at 14, to meet the American Bureau of Shipping requirement for making a weathertight joint. Due to this feature of the invention, either tank may be lifted and rotated independently of any of the other tanks in the group. It is evident that any or all tanks may be lifted or rotated by conventional means, such as jacks, cranes, block and tackle, or the like.

Figure 2:
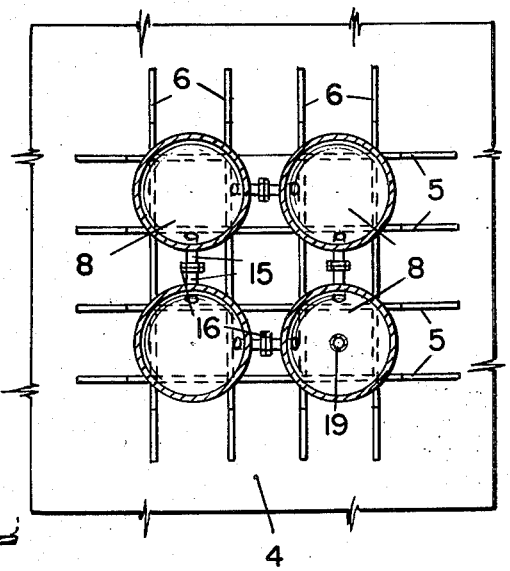
Fig. 2 is a horizontal sectional view taken on the line 2—2 of Fig. 1.

The adjacent tanks communicate at their lower ends by means of substantially U-shaped equalizer pipes 15, and in the structure illustrated, as there are four tanks, four equalizers are employed, and it will be noted from Fig. 2 that the webs 5 and 6 are spaced sufficiently to accommodate the equalizers. Each equalizer is in two parts and the parts are joined together by a pipe coupling 16 which permits the tanks to be disconnected from one another at the bottom of the unit when it is desirable to move any tank of the unit relatively to the other tanks.

The tops of the tanks are also in communication by means of equalizer pipes 17, each made in two parts connected together by a pipe coupling 18, to allow disconnection of one tank from another at the top of the unit to facilitate elevation and rotation of any tank.

As the tanks communicate at the top and bottom, it is obvious that a single eduction line 19, extending to the bottom of one tank, may be used to empty all of the tanks of the unit. This eliminates the necessity of employing an eduction line for each tank.

The unit may be provided with conventional relief valves 20 diagrammatically illustrated, and one tank may have an excess flow valve 21 on the top discharge connection, as is customary in structures of this general character. 22 indicates diagrammatically a vapor line with excess flow check valve, and 23 a back pressure inlet connection, both of which may be connected to one tank only of the group.

It is evident that the tanks will be so constructed as to contain liquefied petroleum gas or the like and the cargo unit is such that the parts may be assembled complete in a shop before installation on a ship, the installation being completed by fastening the cover 10 to the deck and making the required pipe connections at the top of the unit.

From the foregoing, it is believed the construction, operation and advantages of the invention may be readily understood and it is apparent that changes may be made in the details disclosed, without departing from the spirit of the invention, as expressed in the following claims.

What I claim and desire to secure by Letters Patent is:

1. In combination with a ship's deck having a deck hole therein, a portable cargo unit comprising a plurality of substantially parallel, vertically disposed, cylindrical tanks, a combined tank spacer and deck hole cover plate having separate openings through which the respective tanks extend, for maintaining said tanks in relatively fixed positions with respect to one another, each tank being connected to the spacer and cover plate adjacent its respective opening, by a weather tight joint, and means detachably securing said combined tank spacer and cover plate to the deck over said deck hole, whereby said combined spacer and cover plate, together with the tanks supported thereby may be inserted and removed from said deck hole as a unit.

2. The combination as claimed in claim 1 wherein said tanks communicate with one another at the top and bottom of the unit and including an eduction line extending downwardly through the top of one tank and terminating adjacent the bottom of that tank for use in discharging the contents of all of the tanks.

3. The combination as claimed in claim 1 including a cradle fixed below said deck immediately beneath said deck hole for supporting the lower extremities of said tanks.

4. The combination as claimed in claim 1 wherein said tanks are individually removable from said combined spacer and cover plate.

REX V. PHELPS.

REFERENCES CITED

The following references are of record in the file of this patent:

UNITED STATES PATENTS

| Number | Name | Date |
| --- | --- | --- |
| 260,963 | Foster | July 11, 1882 |
| 1,049,490 | Jack | Jan. 7, 1913 |
| 1,296,333 | Shonnard | Mar. 4, 1919 |
| 2,048,312 | Zulver | July 21, 1936 |